Jan. 7, 1958 G. E. HORVATH 2,819,102
SEAL FOR PACKING RINGS IN A STUFFING BOX
Filed Sept. 10, 1952

Inventor
Guy E. Horvath
by: Gary, Desmond & Parker
Attys.

United States Patent Office 2,819,102
Patented Jan. 7, 1958

2,819,102

SEAL FOR PACKING RINGS IN A STUFFING BOX

Guy E. Horvath, Manheim, Pa., assignor to Raybestos-Manhattan, Inc., Passaic, N. J., a corporation of New Jersey Application September 10, 1952, Serial No. 308,833

1 Claim. (Cl. 286—26)

This invention relates to improvements in a packing for a movable member, and refers particularly to a packing comprising a plurality of annular rings disposed in nested or stacked relationship having interposed between adjacent rings a relatively flat annular ring or disc of relatively soft, readily extrudible material.

It is frequently of advantage in the use of packing rings for a movable rod to construct the outer diameter of the packing rings smaller than the inner diameter of the stuffing box which houses the rings thereby permitting a small annular clearance between the outer periphery of the rings and the inner walls of the stuffing box. Using such undersized rings facilitates the installation of the rings and substantially eliminates the possibility of incorrect installation.

However, heretofore if undersized packing rings were used "blow-by" would take place along the stuffing box walls, that is, leakage would take place along said walls. This is frequently a cause of failure of the usual V-type rings due to the rough machine surfaces of the stuffing box walls.

As a feature of the present invention I contemplate the use of undersized packing rings generally of the V-type, wherein a plurality of such rings are disposed in nested or stacker relationship and interposed between adjacent packing rings is a relatively flat annular ring or disc constructed of a relatively soft, readily extrudible material. The packing rings, being undersized, are readily positioned in the stuffing box, there being clearance between the outer periphery of the packing rings and the inner walls of the stuffing box. When gland pressure is applied to the stacked or nested rings, the soft rings or discs interposed between the packing rings are squeezed and extruded outwardly toward the wall of the stuffing box thereby forming a seal with the wall of the stuffing box which prevents the undesirable "blow-by."

In order that the soft rings or discs, when gland pressure is applied, extrude outwardly toward the walls of the stuffing box and not radially inwardly, the packing rings contemplated for use are so contrived as to block flow or extrusion of the extrudible material inwardly. Hence, the packing rings described in my copending application for patent Serial No. 308,832 filed September 10, 1952, now U. S. Patent No. 2,762,640 issued Sept. 11, 1956, are particularly suitable for use in the present invention.

Other objects and advantages of the present invention will be apparent from the accompanying drawing and following detailed description.

In the drawing, Fig. 1 is a detailed sectional view through a conventional stuffing box illustrating the position of the parts before gland pressure is applied.

Figure 1:
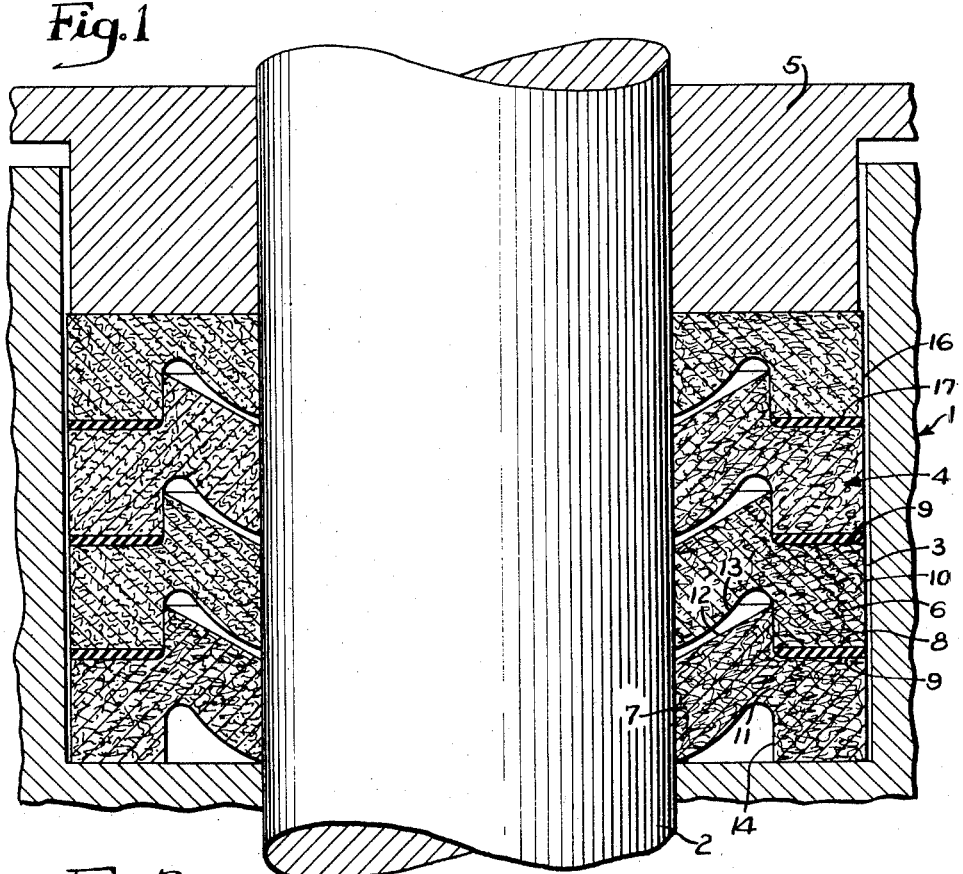

Referring in detail to the drawing, 1 indicates a stuffing box through which a rod 2 moves axially. Rod 2 may be a piston rod or the like along the surface of which it is desired that leakage be prevented. The stuffing box 1 is provided with a cavity 3 which is adapted to contain a plurality of packing rings 4. 5 indicates a packing gland which is adapted to exert pressure upon the rings 4 in a direction parallel to the axis of shaft 2.

For purposes of illustrating my present invention the packing rings 4 are those which comprise the novel subject matter of my hereinbefore identified application for Letters Patent. It is to be understood, of course, that my present invention may be employed with packing rings other than those hereinafter more fully described.

The packing ring 4 is annular and may comprise an endless ring or said ring may be split. The ring 4 may be considered as comprising two portions, a heel portion 6 and a finger portion 7. The heel portion 6 is adapted to be disposed adjacent a stuffing box wall and the finger portion 7 is adapted to be disposed adjacent the member 2 which is to be packed. The heel portion 6 is substantially rectangular in cross section having opposite flat surfaces 8 and 9 and an outer peripheral surface 10. The finger portion 7 of the packing ring 4 is connected to the heel portion 6 by a neck 11 and the finger portion is defined on its upper side by an inclined surface 12 and at the opposite side by a warped or curved surface 13. Thus, a portion of the finger section 7 is offset both radially and axially from the heel section 6.

What makes the packing rings 4 particularly suitable in the present invention is that the heel section 6 is defined at one side by a relatively flat wall 14 and the finger section 7 is defined at one portion of its area by a relatively flat wall 15. It will be noted that the walls 14 and 15 are in plane parallel contacting relationship when a plurality of the packing rings 4 are disposed in stacked or nested relationship. When the packing rings 4 are disposed in stacked or nested relationship the surface 8 of each heel section 6 is disposed parallel and adjacent to the surface 9 of the next lower packing ring heel section. Thus a joint is formed between these adjacent surfaces which terminates at the surface 15. The importance of this relationship will be hereinafter more fully described.

As a feature of the present invention, undersized packing rings may be employed, that is, packing rings whose outside diameter is less than the inner diameter of the stuffing box wall thereby providing a clearance space 16 between the outer periphery of the packing rings and the inner surface of the stuffing box wall. With this arrangement the installation of the packing rings in the stuffing box is greatly facilitated and eliminates the possibility of an improper or incorrect installation of the packing rings. An arrangement such as this, however, wherein the clearance space 16 is provided, is conducive to "blow-by," that is, leakage between the packing rings and the wall of the stuffing box.

Figure 2:
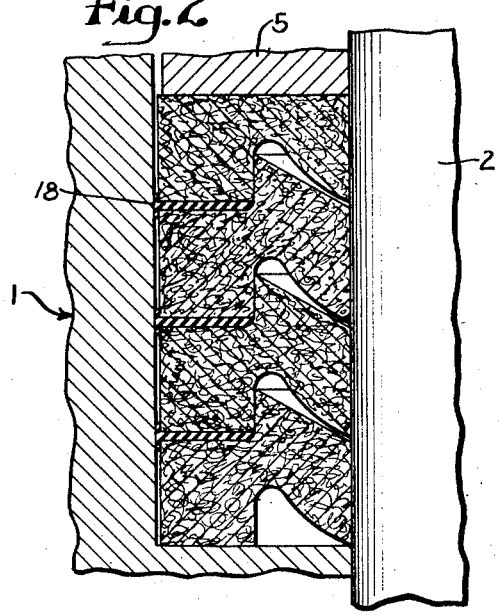
Fig. 2 is a fragmentary sectional view illustrating the parts after gland pressure has been applied.

To prevent such leakage, I employ a relatively flat annular ring or disc 17 which is to be interposed between the surfaces 8 and 9 of the heel sections 6 of adjacent stacked or nested packing rings. The rings 17 are constructed of a relatively soft, resilient, substantially incompressible extrudible material. With the rings 17 interposed between the adjacent packing rings 4 and with no gland pressure applied, the parts assume the relationship illustrated best in Fig. 1. However, when gland pressure is applied, the ring 17 being of a softer and more readily extrudible material than the packing rings 4, will be squeezed between adjacent rings and will be flattened to a predetermined degree. In this fashion a quantity of the material comprising the ring 17 will be extruded readily outwardly from the joints between the surfaces 8 and 9 and will enter the clearance space 16 to form annular seals 18, shown best in Fig. 2.

In order that the material comprising the ring 17 be extruded readily outwardly to form the annular seals 18 it is necessary to so confine the rings or discs 17 that extruding pressure will move the material only in a radially outwardly direction. It can readily be seen, therefore, that the inner periphery of the rings or discs 17 are blocked by the surfaces 15 and hence the material comprising the ring 17 is constrained to move only in one direction, namely, radially outwardly toward the clearance space 16.

As has been hereinbefore mentioned, the use of the relatively soft, resilient extrudible rings or discs 17 is not dependent upon the specific conformation of the packing discs employed except that the inner periphery of the rings 17 be constrained to direct material radially outwardly.

Figure 3:
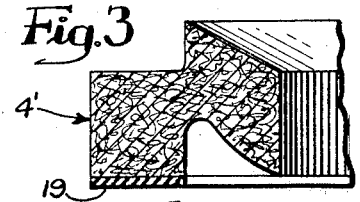
Fig. 3 is a detailed sectional view of a packing ring having a soft ring or disc integrally attached.
Figure 4:
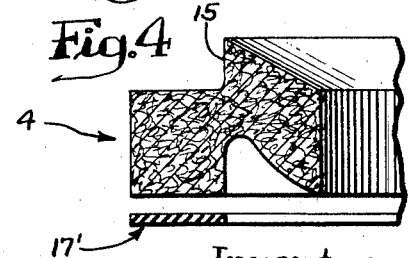
Fig. 4 is a view similar to Fig. 3 wherein the soft ring or disc and packing ring are separate.

In employing the rings 17, said rings may be utilized as separate elements 17′ which may be handled separately from the packing rings 4, as shown best in Fig. 4. However, if desired, the rings may be used in the form of an annular layer 19 which may be cemented or otherwise fixedly secured to the bottom portion of a packing ring 4′, as shown best in Fig. 3. The material constituting the packing rings 4 and 4′ may comprise the conventional material used for packing purposes and may be rubber, plastic in homogeneous form or may comprise rubber or rubber-like material, plastic or the like reinforced by asbestos fibers, cotton fabric or the like. The material comprising the rings 17, 17′ or the layer 19 may be rubber, plastic or a similar rubber-like material preferably in homogeneous form and may be considerably softer and more pliable than the material constituting the packing rings whereby the gland pressure will act to extrude the interposed material and form the seals 18.

I claim as my invention:

A packing for a stuffing box through which a movable member passes wherein the packing is subjected to pressure within the stuffing box exerted parallel to the direction of movement of the movable member which comprises, a pair of nested composition packing rings of a peripheral dimension less than the inner dimension of the stuffing box wherein an annular clearance space is provided between the outer periphery of the packing rings and the inner periphery of the stuffing box, each of said packing rings comprising a heel portion disposed adjacent the stuffing box wall and a finger portion disposed adjacent said movable member, a relatively soft, element separating said packing rings consisting of a relatively flat extrudible ring disposed between the heel portions of adjacent packing rings, said extrudible ring being relatively thin compared to the thickness of said heel portions, each of said finger portions being offset from a respective heel portion to form a shoulder adjacent the inner periphery of said relatively soft, extrudible ring, said extrudible ring being squeezed by said pressure whereby a portion thereof is extruded radially outwardly into said clearance space and axially in said clearance space to form a seal between the packing rings and the stuffing box wall.

References Cited in the file of this patent
UNITED STATES PATENTS

| | | |
|---|---|---|
| 1,321,475 | Rebsamen | Nov. 11, 1919 |
| 1,438,527 | Holmes | Dec. 12, 1922 |
| 1,617,952 | Judd | Feb. 15, 1927 |
| 1,992,967 | Roy | Mar. 5, 1935 |
| 2,063,839 | Crooks et al. | Dec. 8, 1936 |